United States Patent [19]

Hammond et al.

[11] 3,736,755
[45] June 5, 1973

[54] IRRIGATION SYSTEM

[76] Inventors: Roland P. Hammond, 879 W. Outer Drive; John W. Michel, 104 Caldwell Drive, both of Oak Ridge, Tenn. 37830

[22] Filed: Feb. 23, 1972

[21] Appl. No.: 228,676

[52] U.S. Cl. ................................................61/12
[51] Int. Cl. ..........................................E02b 13/00
[58] Field of Search....................................61/12, 13; 137/525.1; 251/145

[56] References Cited

UNITED STATES PATENTS

| | | | |
|---|---|---|---|
| 3,518,831 | 7/1970 | Tibbals et al. | 61/13 |
| 3,080,124 | 3/1963 | Rathmann | 61/13 |
| 544,069 | 8/1895 | Pearson | 61/12 X |
| 2,064,695 | 12/1936 | Sipe | 137/525.1 |
| 2,446,571 | 8/1948 | Browne | 137/525.1 |
| 3,068,616 | 12/1962 | Shibata et al. | 61/13 X |

FOREIGN PATENTS OR APPLICATIONS

| | | | |
|---|---|---|---|
| 884,564 | 12/1961 | Great Britain | 61/12 |
| 23,798 | 8/1935 | Australia | 61/12 |

*Primary Examiner*—David J. Williamowsky
*Assistant Examiner*—David H. Corbin
*Attorney*—Roland A. Anderson

[57] ABSTRACT

The invention relates to a distribution system for subsurface or trickle irrigation of arid land using plastic pipe with spaced wall slits therein. Spring clips encircle the pipe at each slit to define pressure-initiated opening of each slit and the subsequent closure thereof. The pressure of the system may be increased to bring about opening of the slits with the resultant exit of water from each slit. More uniform water distribution results from use of this system and longer runs of piping may be used. Also, occasional application of higher pressure minimizes blockage of the slits by foreign particles.

4 Claims, 3 Drawing Figures

2

IRRIGATION SYSTEM

BACKGROUND OF THE INVENTION

This invention was made in the course of, or under, a contract with the United States Atomic Energy Commission.

Except for flooding techniques, surface sprinkling is probably the oldest means used for irrigation. This may be accomplished from fixed installations or, with sectional piping, from movable systems. The latter has economic advantages in that irrigation can be accomplished in specific areas and then moved as needed. It may be removed for plowing, cultivating and the like. With rising labor costs, this advantage may not be as large as in years past. The system also has certain disadvantages; probably the greatest is the nonuniformity of distribution. This nonuniformity results from wind-induced distortion of the spray pattern and leads to the necessity to apply more water to part of the area than is needed so as to assure adequate amounts in other areas. In addition, evaporation in the air and from the soil surface further reduce efficiencies of water utilization. If fertilizer is applied with the water, or on the surface, run-off of the water gives rise to potential pollution of streams, etc.

Subsurface and trickle irrigation, on the other hand, are efficient methods for the application of water for irrigation. The water is applied more directly to plant roots and little is lost by evaporation except by transpiration through foliage where it is desired. Soil surface losses may be minimized by mulches, etc., These systems have been investigated in recent years as costs of pipe, particularly plastic pipe, have been reduced. An extensive survey of the literature in this field has been compiled and has been published in a Government Report, ORNL-NDIC-9, November 1971, and entitled "Subsurface And Trickle Irrigation — A Survey Of Potentials And Problems."

In general the prior art has utilized plastic pipe, with some sort of wall opening, as laterals from a header. Punched or drilled holes, slots, orifice inserts, or general wall porosity have been used. All of the openings must be small enough to restrict the flow sufficiently in order to operate at a relatively high water pressure and thus maintain a low ressure drop along the lateral line. With holes or slots, problems of nonuniform distribution have been encountered; and with all types, gradual plugging of the openings has occurred from various causes.

Thus, there exists a need for a more effective and efficient system for irrigating arid areas using subsurface or trickle techniques. The present invention was conceived to meet this need in a manner to be described hereinbelow.

SUMMARY OF THE INVENTION

It is the principal object of the present invention to provide a tubing arrangement and an operating system to more economically and effectively irrigate arid areas using subsurface or trickle techniques.

The above object has been accomplished in the present invention by providing a water distribution system employing a slitted plastic pipe or pipes, using a mechanical spring member at each slit whereby opening at a given pressure is assured as well as increasing the closing pressure; and using a pressurized fluid operation so that the slits are opened more or less uniformly. Occasional bursts of water flow aid in clearing any debris from the slit. These features combine to produce more uniform water distribution all along a lateral of the irrigation system and permit use of longer laterals for greater efficiencies than heretofore possible.

DESCRIPTION OF THE PREFERRED EMBODIMENTS

Figure 1:
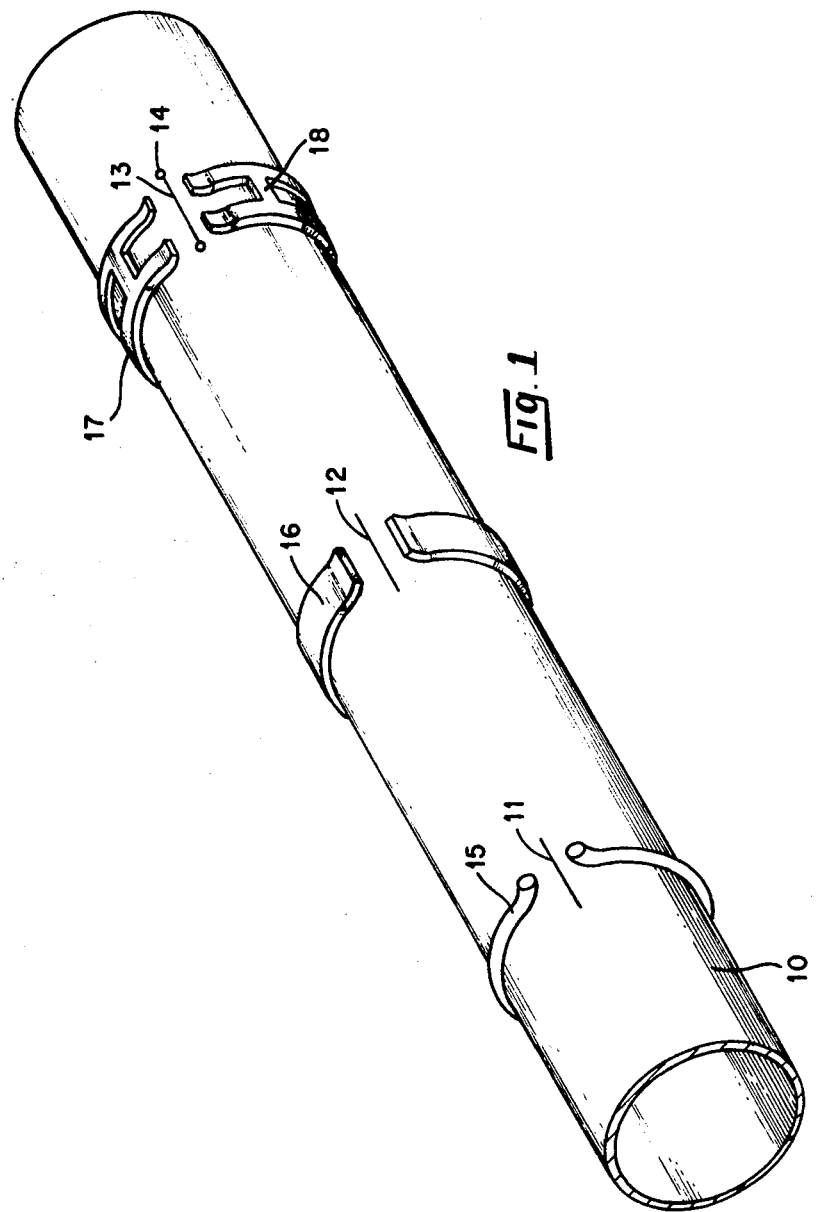
FIG. 1 is an isometric sketch of a portion of a water-distributing pipe illustrating various embodiments of spring clips suitable for controlling exit of water from slits in the pipe.

The spring closure concept of the present invention is illustrated in FIG. 1, which shows several embodiments of spring clips that may be utilized. A plastic pipe or tubing 10 is shown provided with slits 11-13. Typically the pipe may be 0.5 inch I.D. with 1/16 inch wall thickness, with slits placed every 12-24 inches along the pipe. Slits 11 and 12 are assumed to be identical; slit 13 is modified, to overcome tearing if such is the problem, with small-radii holes 14 at each end of the slit. At slit 11 is illustrated a spring clip 15 fabricated from circular spring stock. Each end of clip 15, as in the case of the other embodiments, may be slightly curved away from the pipe surface to prevent cutting the surface thereof during installation and subsequent operation. A flat spring clip 16 is illustrated at slit 12, and a double clip 17, with one or more connecting links 18 is shown at slit 13. Although the operating characteristic would be affected, the clips may be oriented so as to cross over the slits, if desired. It should be understood that in a given installation, identical slits would be utilized as well as identical spring clips and orientation with respect to the slits. The only variations might be the spacing of the slits and the spring constant of the clips to effect a desired water distribution pattern.

Figure 2:
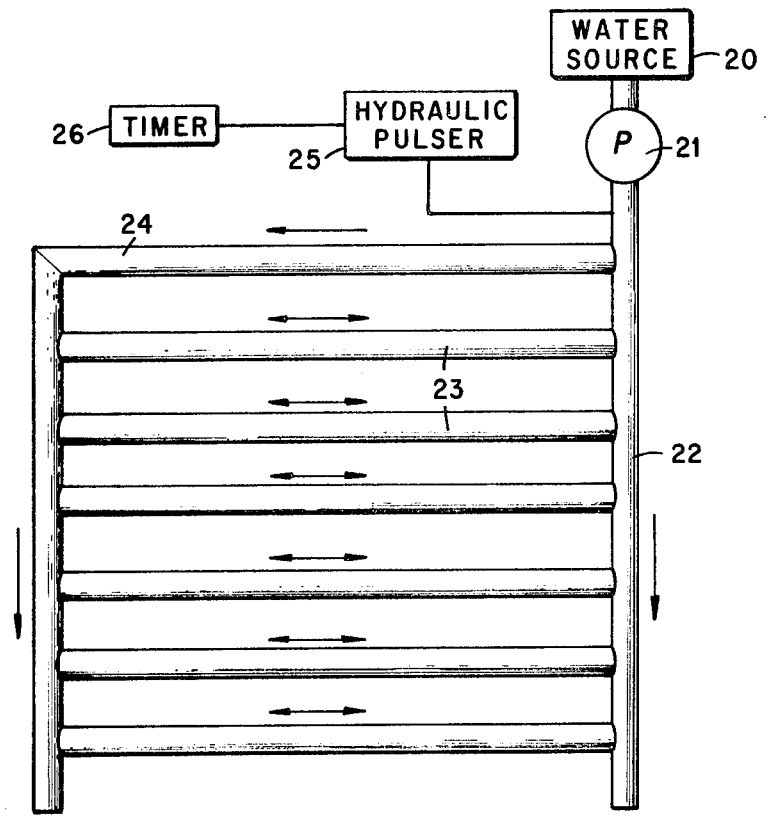
FIG. 2 is a sketch of an overall water distribution system using the design of FIG. 1 or FIG. 3.
Figure 3:
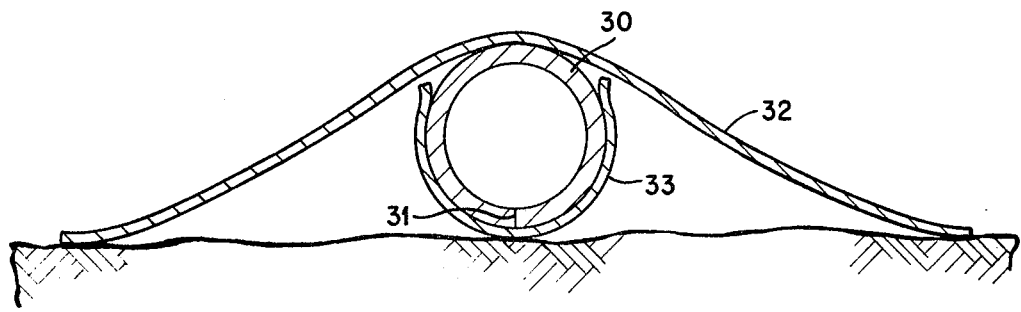
FIG. 3 is a cross-sectional drawing of a possible embodiment for use as a trickle irrigation device in the system of FIG. 2.

FIG. 2 is an illustration of an irrigation system utilizing the tube and clip design of FIG. 1 or FIG. 3. A source of water 20 provides water to a circulating pump 21 unless sufficient head is provided by the source 20, and then pump 21 may be omitted. Water is supplied to a main header 22 to which are connected a plurality of lateral lines 23 of the type shown in FIG. 1. These laterals may be spaced 3-6 feet apart and may be up to 1,500 feet in length. Furthermore, at least a portion of the laterals may be connected at their opposite end to an auxiliary header 24 for the purposes to be described hereinbelow. The slit openings and associated spring clips in the lateral lines 23 of FIG. 2, not shown for the sake of clarity, may be spaced apart in each of the lateral lines by a distance of 12-24 inches with each slit being one-half inch long, for example. It should be noted that the lateral lines 23 are smaller in diameter than the headers 22 and 24 in the actual installation of this system.

Attached to the header 22, and effectively to auxiliary header 24, is a hydraulic pulser 25. This provides pulses of sufficient pressure to produce high velocity flow of water through the slits, not shown, in laterals 23. For example, the pressure peaks may be about an additional 6–8 psi above the normal pressure of the system. Pulser 25 is controlled by a timer 26, or other device, to give the desired flow of water through slit openings at desired time intervals.

No showing is made in FIG. 2 of the valves and other conventional ancillary equipment. One valve that may be desired in the system of FIG. 2 would provide for feeding a portion of the water through auxiliary header 24. This would provide a certain flushing action and would overcome nonuniform distribution if pressure drop along a lateral line 23 is large enough to otherwise cause nonuniform water distribution. Although not shown, alternate laterals may be connected to the header 22 and the others to auxiliary header 24. Alternatively, the plastic laterals 23 could be sealed off at the end opposite the distribution header and thus considerable savings in extra header costs would be realized.

At least two modes of operating the system of FIG. 2 are available for use depending upon the particular needs of the installation. In one mode, the pressure of the source 20 or pump 21 may be of the order of 3–5 psi. This is insufficient to open slits in the piping. Periodically, at either a uniform or nonuniform frequency, the pulser 25 would be operated to bring about water flow through the slits. In the second, and probably preferred mode, the pressure in the system would be maintained constant at 10–20 psig (slits open) for a given time period, e.g., 12 hours, and then reduced to at least a value to close the slits. Once per day, for example, an additional 6–8 psi would be applied by pulser 25 to produce a cleaning action at each slit opening.

The distribution system of FIG. 2 may be utilized underground (for subsurface irrigation) with pipe as illustrated in FIG. 1, or on the surface (for trickle irrigation) with pipe as illustrated in FIG. 3. In FIG. 3, a pipe 30, having spaced slits 31 is attached to a mulch flap 32. The slits 31 are oriented downward, and each slit is normally held in a closed position by a spring clip 33. Flap 32 may extend laterally to near each row of a row crop to prevent excessive evaporation into the atmosphere. Furthermore, this structure is suitable for the distribution of gaseous fertilizer, such as $CO_2$, to the plant foliage.

The embodiments of either FIG. 1 or FIG. 3 may be provided with a riser, not shown, at certain intervals to spray the surface of the ground. This may be desirable to aid the germination of seeds or cool the foliage of plants. Such risers would contain a pressure-operated valve set at, for example, a higher pressure than required for opening the pipe slits. Furthermore, these risers might be provided with a gas-release trap useful for bleeding air from the system and/or the distribution of $CO_2$.

The advantages of the system described hereinabove are as follows:

1. Closure pressure, and thus opening pressure, are governed by the spring clips rather than the pipe wall resiliency. Thus, it is selectable and is predictable over the life of the installation.
2. Pressure pulses will increase the flow through the slits as they open and thus the slits will tend to be self-cleaning.
3. Pulse waves travel with the speed of sound, thus all slits tend to open simultaneously.
4. The system permits gaseous fertilizer application therethrough.
5. Because of 1 and 3 above, operating pressure is increased and the relative pressure drop along each lateral is reduced permitting laterals of about 1,000 feet or longer in length (compared to about 100 feet in the prior art).
6. The system is adaptable to mechanized installation including slitting and application of the spring clips.
7. The system provides for a reduction in pollution via run-off, atmospheric evaporation, loss of fertilizer, etc.
8. The system achieves cost reduction through increased efficiency of water use, lower installed system costs and savings from operating costs.

The system of the present invention can be economically used for large-scale agricultural projects located on coastal deserts, for example, with energy for power generation and desalination being supplied by dual-purpose nuclear-powered reactors which can be built at locations relatively independent of local sources of fuel.

The present invention has been described by way of illustration rather than limitation and it should be apparent that it is equally applicable to all areas where there exists a definite need for irrigation.

What is claimed is:

1. An improved system for the irrigation of arid land comprising a source of water; an elongated, hollow header coupled to said water source; a plurality of hollow, elongated, lateral lines coupled to and in communication with said header, each of said lateral lines provided with a plurality of spaced-apart and normally closed slits; a plurality of spring clips encompassing each of said lateral lines with respective ones of said clips encompassing each of respective ones of said slits in said lines, each of said clips having each end thereof slightly curved away from the associated lateral line; means for supplying water from said source to said header and to the associated lateral lines at some selected pressure value; all of said clips being identical and all of them having the same spring constant, said spring clips maintaining said respective slits closed in the absence of water pressure to said lateral lines, whereby when said selected pressure value is applied to said header and to said lateral lines, said spring constant of each of said clips is overcome to open all of said slits substantially simultaneously thereby effecting a substantially uniform distribution of water through all of said lateral line slits for the effective uniform irrigation of said land with which said header and lateral lines are associated.

2. The system set forth in claim 1, and further including a timed, hydraulic pulser coupled to said header and thus to said lateral lines to provide pulses of an additional pressure at selected time intervals for providing a periodic cleaning or flushing action at each slit opening.

3. The system set forth in claim 1, wherein said header and lateral lines are plastic and are placed underground for sub-surface irrigation.

4. The system set forth in claim 1, wherein said header and lateral lines are plastic and are placed on the ground surface for trickle irrigation, said system further including a mulch flap attached to and completely covering each of said lateral lines with the slits of each lateral line oriented downward.

* * * * *